(12) United States Patent
Posselt et al.

(10) Patent No.: US 10,566,886 B2
(45) Date of Patent: Feb. 18, 2020

(54) FEMALE CONTACT ELEMENT FOR A SLIP RING MOTOR AND SLIP RING MOTOR

(71) Applicant: LINDE AKTIENGESELLSCHAFT, Munich (DE)

(72) Inventors: Heinz Posselt, Bad Aibling (DE); Marco Kleis, Raubling (DE)

(73) Assignee: Linde Aktiengesellschaft, Munich (DE)

( * ) Notice: Subject to any disclaimer, the term of this patent is extended or adjusted under 35 U.S.C. 154(b) by 331 days.

(21) Appl. No.: 15/364,340

(22) Filed: Nov. 30, 2016

(65) Prior Publication Data
US 2017/0163137 A1    Jun. 8, 2017

(30) Foreign Application Priority Data

Dec. 3, 2015 (DE) .......................... 10 2015 015 703

(51) Int. Cl.
| | |
|---|---|
| *H01R 13/115* | (2006.01) |
| *H02K 17/22* | (2006.01) |
| *H01R 13/193* | (2006.01) |
| *H01R 13/03* | (2006.01) |
| *H02K 17/30* | (2006.01) |
| *H01R 13/11* | (2006.01) |

(52) U.S. Cl.
CPC ............. *H02K 17/22* (2013.01); *H01R 13/03* (2013.01); *H01R 13/115* (2013.01); *H01R 13/193* (2013.01); *H02K 17/30* (2013.01); *H01R 13/113* (2013.01)

(58) Field of Classification Search
CPC .................................................... H01R 13/113
See application file for complete search history.

(56) References Cited

U.S. PATENT DOCUMENTS

| | | | | |
|---|---|---|---|---|
| 1,589,066 | A * | 6/1926 | Gibbons | H01H 1/42 200/275 |
| 3,152,857 | A * | 10/1964 | Fisher | H01R 13/15 200/282 |
| 4,461,531 | A * | 7/1984 | Davis | H01R 43/26 439/843 |
| 5,163,835 | A * | 11/1992 | Morlion | H01R 13/03 439/67 |
| 6,529,113 | B2 * | 3/2003 | Endo | H01H 85/0417 337/187 |
| 8,851,940 | B2 * | 10/2014 | Friedhof | H01R 13/111 439/843 |
| 9,017,113 | B2 * | 4/2015 | Haga | H01R 13/03 439/816 |
| 9,331,400 | B1 * | 5/2016 | Bianca | H01R 13/05 |

FOREIGN PATENT DOCUMENTS

GB      1172315      * 11/1969 ............. H01R 13/12

* cited by examiner

*Primary Examiner* — Tho D Ta
(74) *Attorney, Agent, or Firm* — Millen White Zelano & Branigan, PC

(57) ABSTRACT

A female contact element for a slip ring motor with a power output >1 MW. The female contact element is configured for engagement with a male contact element to make an electrical connection between the female contact element and the male contact element. The female contact element is made of a Cu—Be-alloy.

20 Claims, 9 Drawing Sheets

FEMALE CONTACT ELEMENT FOR A SLIP RING MOTOR AND SLIP RING MOTOR

FIELD OF THE INVENTION

The present invention relates to a female contact element for a slip ring motor as well as to a slip ring motor.

SUMMARY OF THE INVENTION

Air separation plants use large-size compressors to compress air. The compressors are driven by induction or asynchronous motors, typically with a power output of 12 to 18 Megawatts (MW).

An induction or asynchronous motor is an AC (alternating current) electric motor in which the electric current in the rotor needed to produce torque is obtained by electromagnetic induction from the magnetic field of the stator winding. An induction motor's rotor can either be of the wound type or squirrel-cage type.

In wound-rotor motors, the rotor windings are connected through slip rings to external resistances. This is why this type of motor is also referred to as a slip ring motor. During startup, the external resistances reduce the field strength at the stator. As a result, the current in the stator winding is limited to the nominal current. When the motor reaches full speed, the rotor poles are switched to short circuit. To this end, a switching mechanism comprising male and female contact elements is used. When the male and female contact elements are disengaged from one another, the current flows through the external resistances. Upon engagement of the male and female contact elements, the rotor poles are switched to short circuit.

The male and female contact elements are mounted so as to rotate along with the stator, for example at 1,500 to 1,800 rounds per minute. Thus, the male and female contact elements see a high centrifugal force. It has been found that female contact elements internally known to the applicant tend to deform severely due to creep and other factors. Deformation of the female contact elements is not only detrimental with regard to proper engagement with corresponding male contact elements, but also electrical contact between the male and female contact elements may be affected negatively. Considering high currents of for example 2 to 3 kA in large slip ring motors passing through each pair of male and female contact elements, reduced electrical contact area results in even higher local currents which may cause local melting or other damage to the material of the contact elements.

An object of the present is to provide an unproved female contact element for a slip ring motor.

This object is achieved by a female contact element for a slip ring motor with a power output >1 MW, wherein the female contact element is configured for engagement with a male contact element thereby making an electrical connection between the female contact element and the male contact element, the female contact element comprising a Cu—Be-alloy.

One concept on which the present invention is based is to manufacture the female contact element, at least partially, from a Cu—Be-alloy (Copper Beryllium Alloy); Cu—Be-alloys have superb spring properties. In particular, the fatigue strength is superior to other copper alloys. This will mitigate or avoid creep in the female contact element under the action of the centrifugal force as described above. Further, Cu—Be-alloys exhibit high electrical conductivity, e.g. in the range $10 \cdot 10^6$ S/m to $35 \cdot 10^6$ S/m, thus the additional resistance introduced in the system—as compared to using other copper alloys—is acceptable.

According to an embodiment, the Cu—Be-alloy comprises 0.1 to 3 wt %, preferably 0.1 to 2 wt % Be.

These wt %—(weight percentage) ranges of Be were found to provide an alloy with desirable strength, electrical conductivity and cost.

According to a further embodiment, the Cu—Be-alloy comprises Ni and/or Co.

Ni (Nickel) and Co (Cobalt) may provide for further desirable properties of the Cu—Be-alloy.

According to a further embodiment, the Cu—Be-alloy is age hardened and/or cold hammered.

Even though other ways of hardening the Cu—Be-alloy are possible, age hardening and cold hammering are preferred. Hardening improves material strength and/or fatigue strength even more.

According to a further embodiment, the Cu—Be-alloy is silver coated.

Silver coating provides enhanced electrical conductivity at the contact areas at which the female and male contact element contact each other. Thus, less heat develops at the contact areas when current flows, increasing life of the contact elements.

According to a further embodiment, the female contact element comprises at least one contact portion comprising or consisting of the Cu—Be-Alloy, the at least one contact portion being configured to be deformed elastically for making the electrical connection.

Herein, "comprising" is to be understood as non-exclusive. Thus, the contact portion may include other materials. On the other hand, "consisting" is to be understood as exclusive. Thus, the contact portion may not include any other material but the Cu—Be-alloy.

According to a further embodiment, the female contact element comprises at least one leaf spring having the at least one contact portion, the at least one leaf spring preferably having a thickness >1 mm, preferably >1.5 mm, and at least one bend having an inside radius of <10 mm, preferably <6 mm.

This thickness and radius were found to result in female contact elements with long service lives.

According to a further embodiment, the female contact element comprises two contact portions defining a slot therebetween, wherein a corresponding contact portion of a male contact element is insertable into the slot, the two contact portions of the female contact element spreading apart elastically when the contact portion of the male contact element is inserted into the slot thereby making the electrical connection, wherein the two contact portions comprise or consist of the Cu—Be-alloy.

This design allows for a releasable connection (for engagement and disengagement of the male and female contact element) to be made. At the same time, the design is simple and provides for a reliable electrical connection.

According to a further embodiment, the female contact element comprises two leaf springs, each leaf spring having a U-shaped portion comprising one of the two contact portions.

The U-shaped portions have a semicircular portion which provides the desired flexibility when the male contact element is inserted into the slot.

According to a further embodiment, the female contact element comprises a restraining unit restraining movement of the two contact portions, wherein the restraining unit is preferably made of steel.

The restraining unit prevents, for example, deformation of the female contact element when rotating with the rotor of the slip ring motor and/or being engaged by the male contact element. Preferably, the restraining unit is made of a material having a higher tensile strength and/or a higher modulus of elasticity than the material the two contact portions are made of. For example, the restraining unit may be made of steel or titanium.

According to a further embodiment, the female contact element comprises two contact portions defining a slot therebetween, wherein a corresponding contact portion of a male contact element is insertable into the slot along a first axis, the two contact portions of the female contact element spreading apart elastically, when the contact portion of the male contact element is inserted into the slot, thereby making an electrical connection between the two contact portions of the female contact element and the contact portion of the male contact element, wherein the two contact portions are, at least partially, moved along a second axis, respectively, as they are spread apart elastically, the first and second axis being oriented perpendicularly to each other, and a restraining unit restraining movement of the two contact portions along a third axis oriented perpendicularly to the first and second axis, wherein the restraining unit comprises an abutting portion, the two contact portions abutting against the abutting portion when moved along the third axis. During operation of the slip ring motor, the centrifugal force will tend to deform the two contact portions. The direction in which the centrifugal force acts corresponds to the third axis when the female contact element is mounted on the slip ring motor. The abutting portion prevents such deformation of the contact portions. Thus, damage to the two contact portions due to creep or other plastic deformation is a lot less likely to occur.

The female contact element may comprise two leaf springs nested inside each other. Thus, the one leaf spring forms an outer leaf spring and the other leaf spring forms an inner leaf spring. The inner and outer leaf springs are each provided with a U-shaped portion at their respective ends. Thus, four U-shaped portions are formed defining a total of two slots.

Preferably, the male contact element is of a U-shape having two free ends. Each free end is formed as a contact portion. The two contact portions of the male contact element are insertable into the two slots of the female contact element.

According to a further embodiment, a plurality of projections project from free ends of the two contact portions, wherein the restraining unit engages the projections.

The projections may project along the third axis. By way of the projections engaged by the restraining unit, forces and moments may be transferred effectively from the two contact portions into the restraining unit. Vice versa, deformations of the two contact portions may thus be controlled accurately.

According to a further embodiment, the restraining unit is configured to restrain movement of the projections along the first and/or second axis.

In particular, when the contact portion of the male contact element is removed from the slot, i.e. disengaged, the two contact portions experience high forces along the first axis. This may be a result of local welding of the two contact portions of the female contact element and the contact portion of the male contact element due to the high currents passing through the male and female contact element. The projections are thus particularly well suited to prevent bending of the two contact portions when the contact portion of the male contact element is removed from the slot.

According to a further embodiment, the projections comprise a first and a second projection projecting from each of the two contact portions in opposite directions along the third axis.

For reasons of symmetry and with regard to moments acting on the two contact portions, it may be preferable to provide first and second projections on either side of a respective contact portion.

According to a further embodiment, the restraining unit comprises, adjacent to the abutting portion, a recess engaging at least one or more of the projections. Alternatively, the recess may be formed as a hole, for example as a cutout in a bar or plate.

Advantageously, a recess is well suited to restrain movement in one or both directions (positive and negative direction) along the first and/or second axis. For example, the restraining unit may comprise a hook or latch (also more generally referred to herein as a free end) having the recess, wherein the latch hooks over two projections associated with the two contact portions.

According to a further embodiment, one or more of the projections are made in one piece with an associated contact portion and, preferably, and of the same material as the associated contact portion.

For example, two leaf springs are provided, each leaf spring having one of the two contact portions including one or more projections, respectively. The leaf springs including the contact portions and the projections may be cut from a blank in a single step.

According to a further embodiment, the female contact element comprises a base to which the two leaf springs are attached, wherein the base is preferably made of steel.

Preferably, the base is made of a material having a higher tensile strength and/or a higher modulus of elasticity than the material the two contact portions are made of. For example, the base may be made of steel or titanium.

According to a further embodiment, the female contact element comprises a base and two leaf springs, each leaf spring comprising a base portion and one of the two contact portions, wherein a respective base portion is attached to the base, and wherein the restraining unit engages the projections from behind with respect to the base.

In this manner, the projections are fixed in a direction away from the base along the first axis.

According to a further embodiment, the restraining unit has a U-shaped bracket, the bracket comprising free ends forming abutting portions for the two contact portions to abut against in opposite directions along the third axis.

The bracket may be attached to a base of the female contact element. Movement of the two contact portions in the positive and negative direction along the third axis is thus restrained.

According to a further embodiment, the female contact element comprises a leaf spring, wherein the bracket grasps around a U-shaped portion of the leaf spring, the U-shaped portion comprising one of the two contact portions.

This may provide for a compact design of the female contact element.

According to a further embodiment, the female contact element further comprises an outer and inner leaf spring having four contact portions defining two slots therebetween, the bracket grasping around U-shaped portions of the inner leaf spring comprising two contact portions of the four contact portions, wherein the base has a shape and grasps around U-shaped portions of the outer leaf spring comprising the other two contact portions of the four contact portions, wherein free ends of the base are shaped so as to converge towards each other.

Whereas the bracket restrains deformation of the U-shaped portions of the inner leaf spring, the base restrains deformation of the U-shaped portions of the outer leaf spring. Thus, a stable design is obtained. The bracket may have a U-shape or Double-U-shape or H-shape.

According to a further embodiment, the restraining unit has a cage, the cage forming abutting portions for the two contact elements to abut against in opposite directions along the third axis.

A cage—as opposed to a bracket—may provide more resistance to, for example, moments, or, in other words, a lighter design may be used for a cage as opposed to a bracket to obtain the same stability. On the other hand, the bracket may be easier to manufacture, and attaching of the bracket to the base may be easier than attaching the cage to the base. Yet, either of the designs (bracket or cage) is equally feasible. The cage may be of a rectangular shape, in particular.

According to a further embodiment, the female contact element further comprises two leaf springs, wherein the cage grasps around a U-shaped portion of the two leaf springs, respectively, each U-shaped portion comprising one of the two contact portions.

Thus, the cage is configured to support the U-shaped portions of both leaf springs, for example an inner and an outer leaf spring. This represents an alternative embodiment compared to the one described previously using a bracket in combination with a base to support the U-shaped portions of the inner and outer leaf spring.

According to a further embodiment, the female contact element comprises a plurality of leaf springs preloading the two contact portions so as to counteract their spreading apart when the contact portion of the male contact element is inserted into the slot, wherein the preload produced by each leaf spring is the same, wherein the leaf springs are preferably made of steel.

Preferably, the preload leaf springs are made of a material having a higher tensile strength and/or a higher modulus of elasticity than the material the two contact portions are made of. For example, the preload leaf springs may be made of steel. Preferably, the leaf springs preload the two contact portions along the second axis so as to counteract their spreading apart. Thus, a contact pressure exerted by the two contact portions of the female contact element on the contact portion of the male contact element, when the latter is inserted into the slot, is constant along the first axis. This improves electrical conductivity (by way of increasing the surface contact area), and thus reduces heat loads on the material of the contact portions. Further, by way of the plurality of leaf springs, the two contact portions are not overly loaded when deformed for inserting the contact portion of the male contact element.

According to a further embodiment, each leaf spring has the shape of an isosceles trapezoid comprising a base, two legs and an open side, wherein the two contact portions reach through the open side and a free end of a respective leg preloads an associated contact portion.

This design is well suited to use a single leaf spring to preload both contact portions, simultaneously.

According to a further embodiment, the leaf springs have different thicknesses.

The leaf springs exert the respective preload at different heights of the contact portions. Thus, in order to provide the same preload, the leaf springs see different moments. By choosing the leaf springs with different thicknesses, the stress in each leaf spring is kept at approximately the same level.

According to a further embodiment, the leaf springs are nested inside one another.

Thus, a compact design of the female contact element is obtained.

According to a further embodiment, at least three leaf springs are provided.

In this manner, the preloads are more evenly distributed over the height of each contact portion (height referring to the first axis).

Furthermore, a slip ring motor, in particular with a power output of >1 or >10 Megawatt (MW), comprising a female contact element as described above is provided.

In other embodiments, the slip ring motor may have a power output >10 MW. Further, the slip ring motor may be coupled to a compressor of an air separation plant. The embodiments of features described with reference to the female contact element of the present invention apply mutatis mutandis to the slip ring motor.

"A" or "one" element is not to be understood as limited to only one element, but more than one element, for example two, three or more elements may be provided. By the same token, "two" or any other wording herein relating to a specific number is not to be understood as being limited to that number of elements only, but any other number of elements may be provided.

"Perpendicularly" or "at right angles" preferably includes deviations of up to 20°, preferably up to 10° and more preferably up to 3° from a line being perfectly perpendicular or at right angles.

BRIEF DESCRIPTION OF THE FIGURES

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Further embodiments, features and advantages of the present invention will become apparent from the subsequent description and dependent claims, taken in conjunction with the accompanying drawings.

DETAILED DESCRIPTION OF THE EMBODIMENTS

Figure 1:
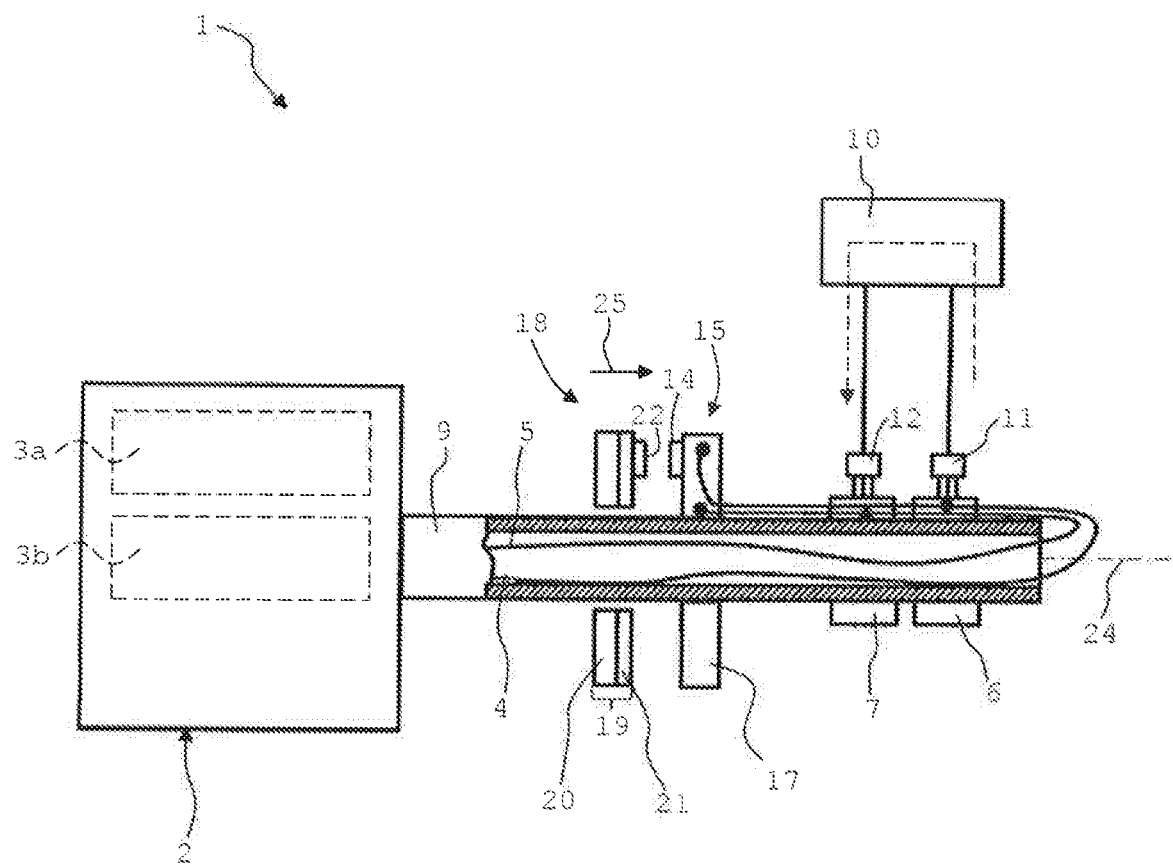
FIG. 1 shows, in a partial section view, a slip ring motor according to an embodiment.

In the Figures, like reference numerals designate like or functionally equivalent elements, unless otherwise indicated.

FIG. 1 shows, in a partial section view, a slip ring motor 1 in accordance with an embodiment of the present invention.

The slip ring motor 1 drives a compressor (not shown) used in an air separation plant, for example. The slip ring motor 1 comprises a rotor 2 arranged inside a stator (not shown). The rotor 2 is of the wound type. The rotor 2 comprises multiple windings 3a, 3b. The windings 3a, 3b are connected by a first and a second electric cable 4, 5 to a first and a second slip ring 6, 7. In order to simplify representation, only two cables 4, 5 and two slip rings 6, 7 are shown in FIG. 1. Typically, six or more cables and corresponding slip rings are provided.

The cables 4, 5 are guided from the windings 3a, 3b to the slip rings 6, 7 inside a hollow shaft 9 (shown in partial section) of the rotor 2. The slip rings 6, 7 are rotationally fixed to the shaft 9 so as to rotate with the same. The slip rings 6, 7 are contacted by brushes 11, 12, respectively. The brushes 11, 12 are stationary and connected electrically to an external resistance 10.

The cable 4 is shown to be connected to the slip ring 6, and the cable 5 is connected to the slip ring 7. Further, the cable 4 is connected, preferably by a contact bolt (not shown), to a male contact element 14 of a first rotating unit 15 (see FIG. 3), and the cable 5 is connected, preferably by another contact bolt (not shown), to a male contact element 16 of the first rotating unit 15. Black dots in the FIGS. 1 and 3 indicate points of electrical connection of the cables 4, 5 or contact bolts.

Figure 3:
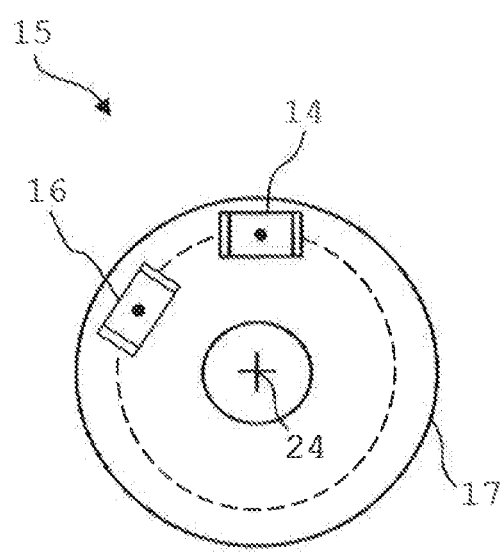
FIG. 3 shows, in an axial view, a second ring unit from FIG. 1 comprising male contact elements.

The first rotating unit 15 may comprise a ring 17 as seen in the axial view of FIG. 3. The ring 17 is made of a material electrically insulating the male contact elements 14, 16 against each other. For example, the ring 17 is made of glass fiber composite.

Figure 2:
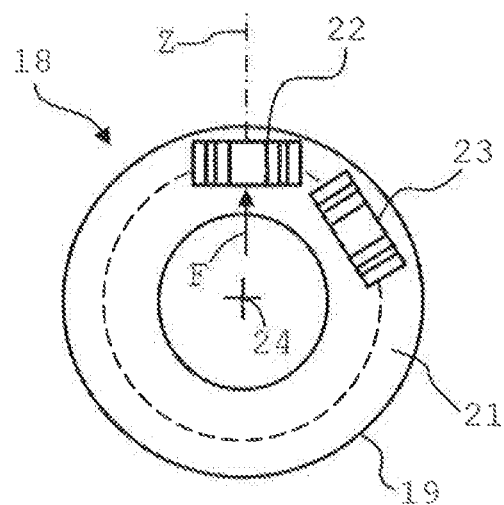
FIG. 2 shows, in an axial view, a first ring unit from FIG. 1 comprising female contact elements.

Further, the slip ring motor 1 comprises a second rotating unit 18 shown in an axial view in FIG. 2. The second rotating unit 18 comprises a ring 19. The ring 19 is made up of a base ring element 20 (see FIG. 1) and a conducting ring element 21. The base ring element 20 is configured as an electrical isolator and for example made of glass fiber composite. The conducting ring element 21 on the other hand is made of a conducting material, for example copper. Female contact elements 22, 23 (see FIG. 2) are attached to the conducting ring element 21, wherein electrical connection is made between the female contact elements 22, 23 and the conducting ring element 21.

Of course, the first rotating unit 15 may comprise more than two, for example six to twelve male contact elements, and the second rotating unit 18 may comprise more than two, for example six to twelve female contact elements, as indicated by the dotted lines in FIGS. 2 and 3. For illustration purposes, only two such elements are shown in FIGS. 2 and 3, respectively.

Both rotating units 15, 18 are attached to the shaft 9 so as to rotate with the same. Yet, the first rotating unit 15 is also fixed axially to the shaft 9, whereas the second rotating unit 18 is configured to be moved along the axis 24 on the hollow shaft 9.

FIG. 1 shows a first state in which the first and second rotating unit 15, 18 are spaced apart from each other such that the male and female contact elements 14, 16, 22, 23 are disengaged from one another. Thus, the cables 4, 5 and their corresponding windings 3a, 3b are not switched to short circuit. Consequently, the inrush current induced during startup of the slip ring motor 1 passes from the winding 3a through the cable 4, via the slip ring 6 and the brush 11 into the external resistance 10. The external resistance 10 may comprise an electrolyte or any other high-resistance material. After passing through the external resistance 10, the current returns to the winding 3b via the brush 12, the slip ring 7 and the cable 5. The path of the current through the external resistance 10 is indicated by a dashed arrow.

When the slip ring motor 1 has started up, i.e. as the rounds per minute of the rotor 2 increase, the current through the cables 4, 5 becomes smaller. Thus, it is desirable to switch off the external resistance 10 when the slip ring motor 1 has reached its nominal speed. To this end, the second rotation unit 18 is moved in a direction 25 along the axis 24 into a second state (not shown), in which the male contact elements 14, 16 engage the female contact elements 22, 23. Thus, the cables 4, 5 are switched to short circuit since the current goes from the cable 4 through the male contact element 14 into the female contact element 22, through the conducting ring element 21 and via the female contact element 23 and the male contact element 16 into the cable 5.

Even though presently only explained with respect to a single phase and/or a single pair of windings 3a, 3b, the same principle holds for the other phases and/or other pairs of windings.

Figure 4:
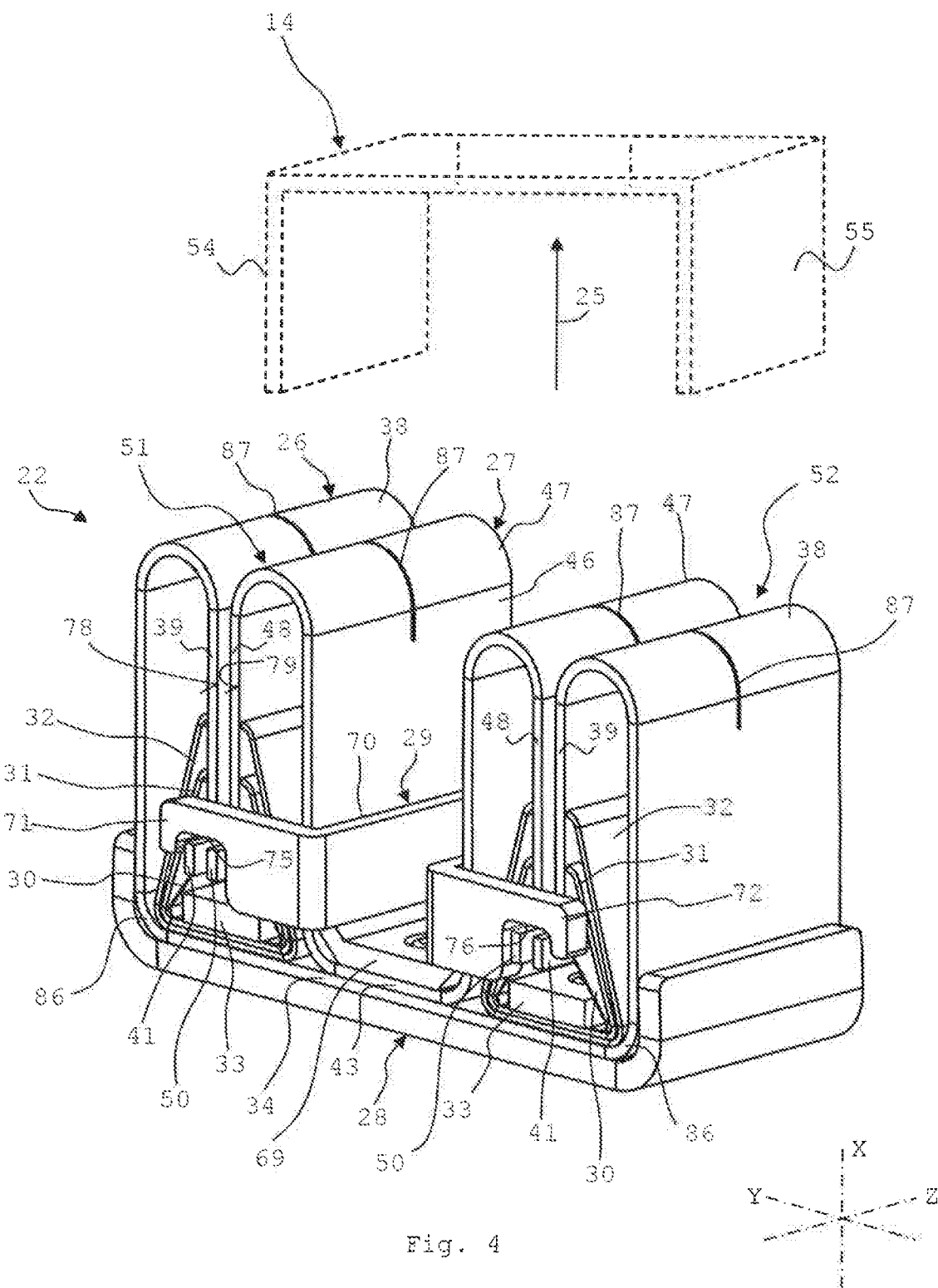
FIG. 4 shows, in a perspective view, a female contact element from FIG. 2.

FIG. 4 shows, in a perspective view, the female contact element 22 of FIGS. 1 and 2. The corresponding male contact element 14 is indicated by dashed lines.

The female contact element 22 is comprised of two leaf springs, namely an outer leaf spring 26 and an inner leaf spring 27, a base 28, a bracket 29 (more generally referred to herein as a restraining unit), nested preloading springs 30, 31, 32 and counter plates 33.

Figure 5:
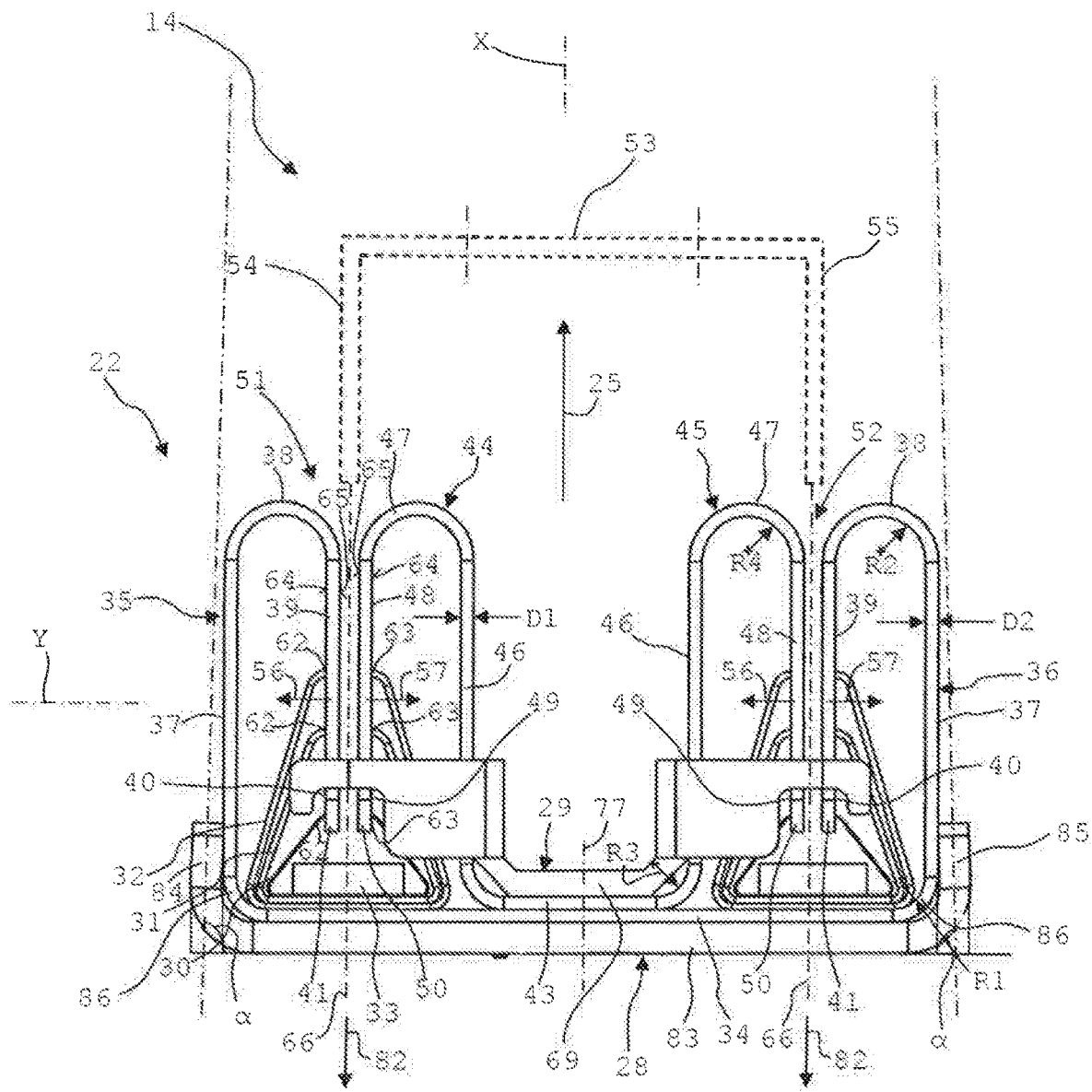
FIG. 5 shows, in a side view, the female contact element of FIG. 4.
Figure 7:
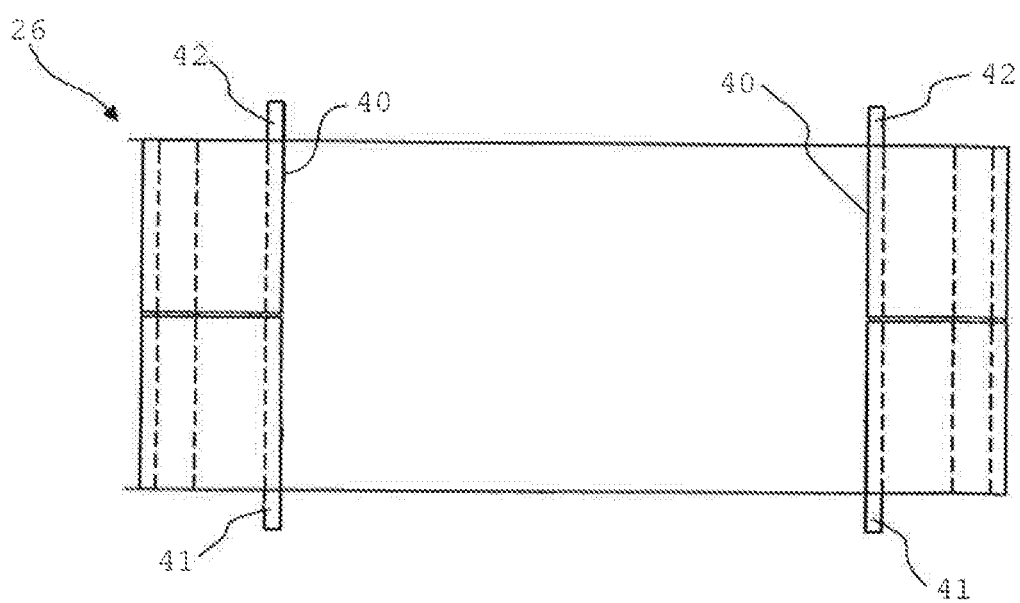
FIG. 7 shows, in a top view, an outer leaf spring from FIGS. 4 to 6.

The design of the outer and inner leaf springs 26, 27 will be explained in more detail with reference to FIG. 5, showing the female contact element 22 in a side view, and FIG. 7 showing the outer leaf spring 26 in a top view.

The outer and inner leaf springs 26, 27 consist of a Cu—Be-Alloy. The Cu—Be-Alloy may comprise 0.1 to 3 wt %, preferably 0.1 to 2 wt % of Be, and, in addition, Ni and Co. Particularly long service lives of the outer and inner leaf springs 26, 27 were obtained using a Cu—Be-Alloy comprising 0.34 wt % Be, 1.68 wt % Ni and 0.07 wt % Co. Further, even higher durability was found when the Cu—Be-Alloy was hardened, for example age hardened and/or cold hammered. Coating the outer and inner leaf springs 26, 27 with silver was found to improve the electrical connection between the female contact element 22 and the male contact element 14, 16 even more.

The outer leaf spring 26 has a flat base portion 34 connected to two U-shaped portions 35 and 36 connected at opposite ends of the base portion 34. Each U-shaped portion 35, 36 is comprised of a straight portion 37 at right angles—via a bend with an inside radius R1—with the base portion 34 and connected thereto, a bent portion 38 bent semi circularly having an inside radius R2 and connected to the straight portion 37, and a straight contact portion 39 connected to the bent portion 38 and reaching downward from the bent portion 38 towards the base portion 34. The contact portion 39 has a free end 40 with projections 41, 42 (see FIG. 7) made in one piece therewith.

The inner leaf spring 27 similarly comprises a flat base portion 43 and U-shaped portions 44, 45 connected at opposite ends of the base portion 43. Each U-shaped portion 44, 45 is made up of a straight portion 46 at right angles—via a bend with an inside radius R3—with the base portion 43 and connected thereto, a bent portion 47 bent semi-circularly having an inside radius R4 and connected to the straight portion 46, and a straight contact portion 48 connected to the bent portion 47. The contact portion 48 reaches down from the straight portion 47 towards the base portion 43 and comprises a free end 49. Projections 50 (the projection at the other end is not shown in the Figures) are connected to the free ends 49 in one piece.

The outer and inner leaf springs 26, 27 may be manufactured by way of bending from flat plate material having a constant thickness. Due to the fact that the outer and inner leaf spring 26, 27 are made of the Cu—Be-alloy, the radii R1, R2, R3 and R4 can be chosen small, e.g. <10 mm, preferably <6 mm, without raising stresses in the material beyond levels which would reduce the lives of the outer and inner leaf spring 26, 27 significantly. Particularly long service lives were obtained with R1 to R4 equals 2 mm, respectively. At the same time, due to the choice of material (Cu—Be-alloy) thicknesses D1 and D2 of the leaf springs 26, 27 can be—advantageously—chosen fairly large at >1 mm, preferably >1.5 mm. Particularly good results were obtained with D1 and D2 equals 2 mm.

Each pair of contact portions 39, 48 of the outer and inner leaf spring 26, 27 define a slot 51, 52 therebetween. The male contact element 14 is substantially U-shaped having a base 53 and two contact portions 54, 55 connected to the base 53 at right angles. The male and female contact elements 14, 22 are shown in a disengaged state in FIGS. 4 and 5. For engagement, the female contact element 22 is moved in the direction of the arrow 25 along a first axis X. The contact portions 54, 55 of the male contact element 14 are thus moved into the slots 51, 52 of the female contact element 22 with the contact portions 39, 48 spreading apart elastically in opposite directions 56, 57 along a second axis Y perpendicular to the first axis X. This elastic movement of the contact portions 39, 48 is counteracted by the three preloading springs 30, 31, 32.

In a further embodiment, only portions of the female contact element 22, e.g. the contact portions 39, 48, are silver coated, and the remainder of each of the outer and inner leaf springs 26, 27 is not coated at all or coated with Zn. Again, this may reduce material cost.

Figures 9, 10, 11:
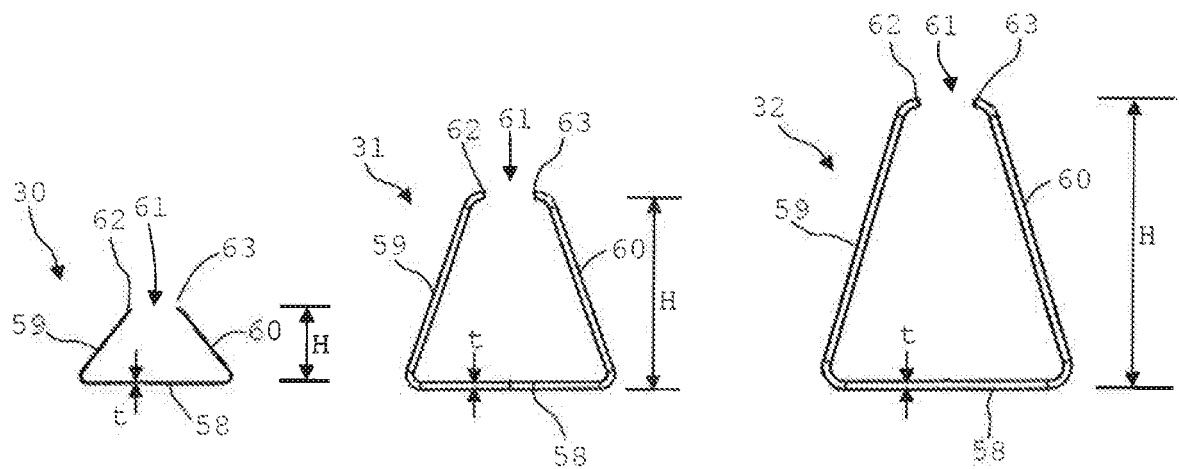
FIGS. 9 to 11 show side views of leaf springs used in the female contact element of FIGS. 4 to 6.

The preloading springs are comprised of a first leaf spring 30, a second leaf spring 31 and a third leaf spring 32, and are shown in more detail in FIGS. 9, 10 and 11.

The preloading springs 30, 31, 32 each comprise a base 58, two legs 59, 60 connected to opposite ends of the base 58 and an open side 61. The open side 61 is defined between two free ends 62, 63 of the legs 59, 60. The preload springs 30, 31, 32 differ in height H and in thickness t. The thickness t of the corresponding leaf spring material increases with increasing height H of the preload springs 30, 31, 32. Preferably, the leaf spring material is steel.

Now returning to FIG. 5, it is shown that due to the different heights H of the preload springs 30, 31, 32, these contact an associated contact portions 39, 48 at different positions along the first axis X. Since the thickness t of the preload springs 30, 31, 32 increases with the increasing height H, the preload force exerted by each free end 62, 63 is constant as a corresponding lever arm becomes longer. Therein, the preload springs 30, 31, 32 act on an outside surface 64 of a respective contact portion 39, 48. A corresponding inside surface 65 of a respective contact portion 39, 48 defining the surface contacting the contact portion 54, 55 of the male contact element 14 is designated with reference numeral 65.

The preload springs 30, 31, 32 thus ensure large surface contact between the contact portions 39, 48 of the female contact element 22 and a respective contact portion 54, 55 of the male contact element 14. This avoids excessive temperatures due to high local currents which improves the life of the corresponding contact surfaces.

The preload springs 30, 31, 32 are nested inside one another as for example shown in FIG. 5. This means that the preload spring 31 is arranged inside the preload spring 32 and the preload spring 30 is arranged inside the preload spring 31. The nested preload springs 30, 31, 32 are in turn arranged inside the space defined inside the two U-shaped portions 35, 44 of the leaf springs 26, 27. The preload springs 30, 31, 32 are fastened by the counter plate 33 and corresponding rivets or bolts 66 to the outer leaf spring 26 and the base 28.

Figure 8:
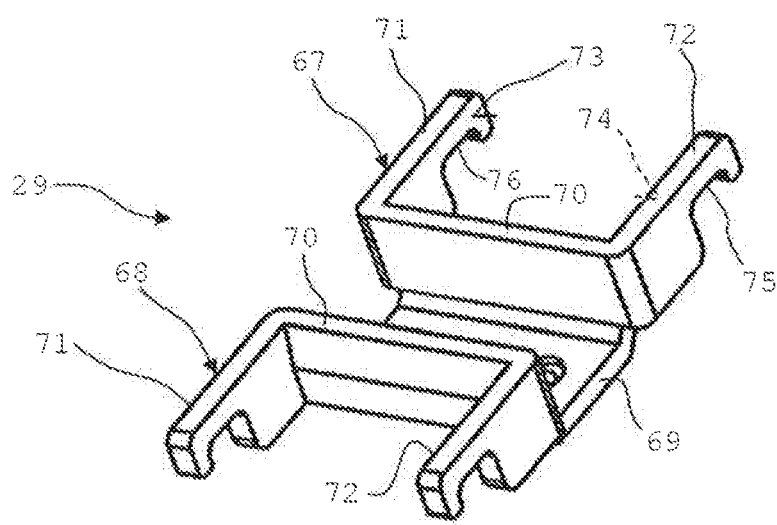
FIG. 8 shows, in a perspective view, a bracket from FIGS. 4 to 6.

FIG. 8 illustrates a perspective view of the bracket 29.

The bracket 29 is comprised of a single plate material, preferably steel, formed into an H-shape. The bracket 29 thus has two U-shaped portions 67, 68 connected back-to-back to each other by a base portion 69. Each U-shaped portion 67, 68 is made up of a side 70 and hooks or latches 71, 72 (also referred to more generally herein as free ends) connected at opposite ends of the side 70. Each latch 71, 72 forms an abutting portion 73, 74 on a respective inside surface. A recess 75, 76 is formed in each latch 71, 72 adjacent to a respective abutting portion 73, 74.

Figure 6:
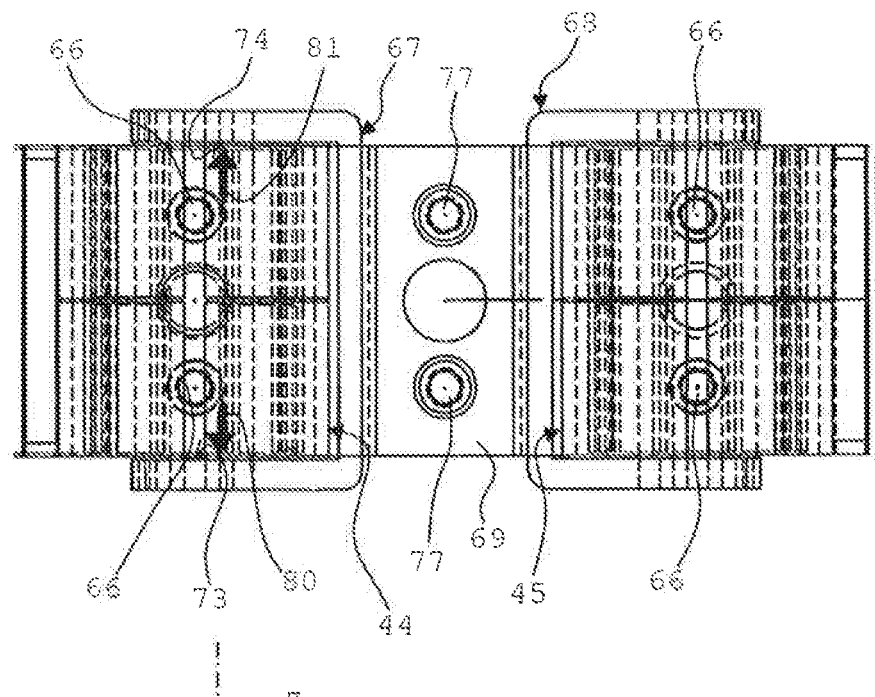
FIG. 6 shows a top view from FIG. 5.

As shown in FIGS. 4 and 5, the base portion 69 of the bracket 29 is attached by means of rivets or bolts 77 to the inner spring 27 and the base 28. The U-shaped portions 67, 68 of the bracket 29 grasp around the U-shaped portions 44, 45 of the inner leaf spring 27, as also shown in FIG. 6. Thus, the abutting portions 73, 74 of the bracket 29 come to lie in front of respective side faces 78, 79 (see FIG. 4) of the contact portions 39, 48 in opposite directions 80, 81 (see FIG. 6) along a third direction Z. The third axis Z is oriented perpendicularly with respect to the first and second axis X, Y.

The abutting portions 73, 74 are thus configured to stop a movement of the contact portions 39, 48 under the action of a centrifugal force F (see FIG. 2) acting on the female contact element 22 in the direction 80 along the third axis Z. Thus, deformation inside the contact portions 39, 48 can be limited to allowable levels to permit a long life of the female contact element 22.

FIGS. 4 and 5 further illustrate that the latches 71, 72 reach over the projections 41, 42, 50. Thus, a pair of projections 41, 50 and 50 (the other projection is not shown) of corresponding contact portions 39, 48 are arranged inside an associated recess 75, 76 inside the latches 71, 72. To this end, the projections 41, 50 project in the direction 80 along the third axis Z and the projections 42 (the other projections are not shown) project in the opposite direction 81 along the third axis Z from respective free ends 40, 49 of the contact portions 39, 48. As seen from the base 28, the latches 71, 72 engage the projections 41, 42, 50 from behind. Thus, movement of the projections 41, 42, 50 in the direction 25 along the first axis X as well as in the directions 56, 57 along the second axis Y is restrained. Movement of the projections 41, 42, 50 in the direction 82 (see FIG. 5) is automatically restrained by the geometry of the leaf springs 26, 27.

This design is particularly advantageous with regard to forces exerted on the contact portions 39, 48, when the male contact element 14 is pulled out of the slots 51, 52 for disengagement. The projections 41, 42, 50 together with the latches 71, 72 prevent bending of the contact portions 39, 48 in this case.

The base 28 has itself a U-shape comprising a base portion 83 and free ends 84, 85. Preferably, the base 28 is made of steel. The free ends 84, 85 each form an angle α with the base portion 83 smaller than 90°. Thus, the free ends 84, 85 converge towards each other as indicated by the dot-dashed lines in FIG. 5. Therein, the free ends 84, 85 are preloaded against the straight portions 37 of the U-shaped portions 35, 36 of the outer leaf spring 26. At the same time, the convergence of the free ends 84, 85 results in a positive fit between the base 29 and edges 86 formed between respective straight portions 37 and the base portion 34 of the outer leaf spring 26 in the direction 25. This design gives the U-shaped portions 35, 36 additional resistance against moments occurring when the male contact element 14 is engaged and disengaged from the female contact element 22, and also improves surface contact between the contact portions 39, 48 and 44, 45.

Similarly, resistance to said bending moments and improved surface contact is obtained by the sides 70 of the bracket 29 supporting the straight portions 46 of the inner leaf spring 27.

Preferably, one or more incisions 87 are provided in each U-shaped portion 35, 36, 44, 45 of the outer and inner leaf spring 26, 27. The incisions reach through the bent portions 38, 47 into the straight portions 37, 46 and into the contact portions 39, 48 at each U-shaped portion 35, 36, 44, 47. These incisions 87 also improve surface contact between the contact portions 39, 48 and 54, 55.

Figure 12:
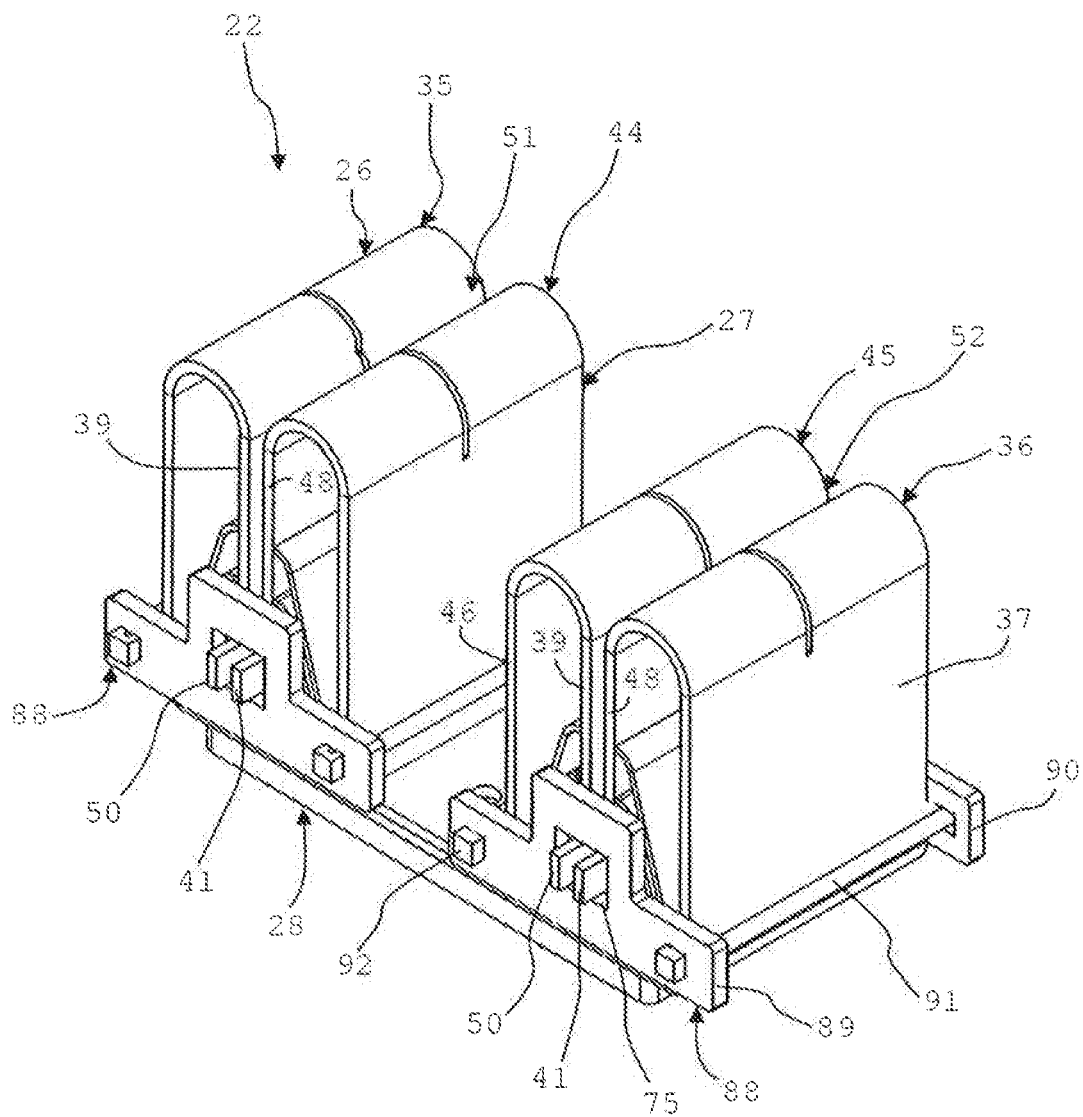
FIG. 12 shows, in a perspective view, a female contact element according to a further embodiment.

FIG. 12 shows a female contact element 22 according to a second embodiment of the present invention. Explanations hereinafter focus on the differences with regard to the first embodiment explained in connection with FIGS. 4 to 11.

Instead of using a bracket 29 as a restraining unit, restraining movement of the contact portions 39, 48, cages 88 are used. The cages 88 are of a rectangular shape. Hereinafter, the cage 88 on the right-hand side of FIG. 12 will be explained in more detail—explanations applying mutatis mutandis to the cage on the left-hand side of FIG. 12.

Figure 13:
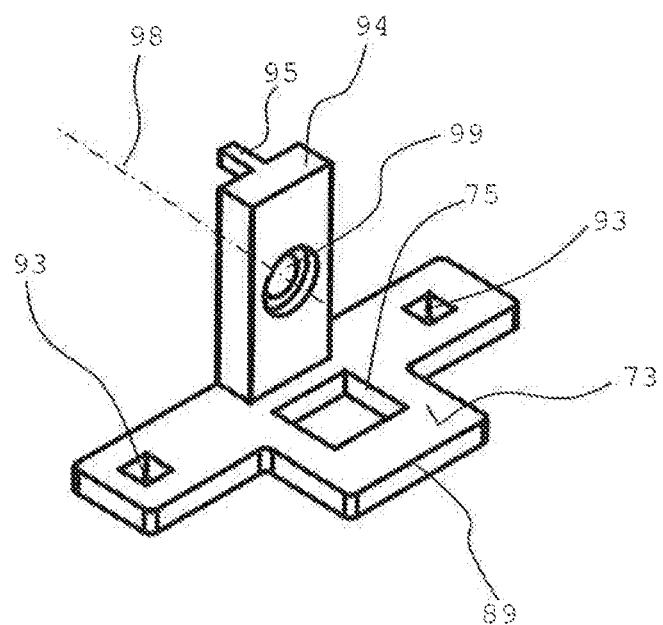
FIG. 13 shows, in a perspective view, a part of a cage from FIG. 12.

The cage 88 comprises two plates 89, 90 connected to one another by bars 91, 92. Preferably, the cage 88 is made of steel or other material with a high E-Modulus and the tensile strength. The plates 89, 90 comprise as seen in FIG. 13—the abutting portions 73, 74 (the latter is not shown in any of the Figures) on their inside surfaces. Next to the abutting portion 73, 74 is formed the recess 75, 76 (the latter is not shown in any of the Figures). The recess 75, 76 is formed as a, for example, square hole. When engaged with the projections 41, 42, 50, these are restrained in opposite directions 25, 82 (see FIG. 5) along the first axis X and in opposite directions 56, 57 along the second axis Y.

Figure 14:
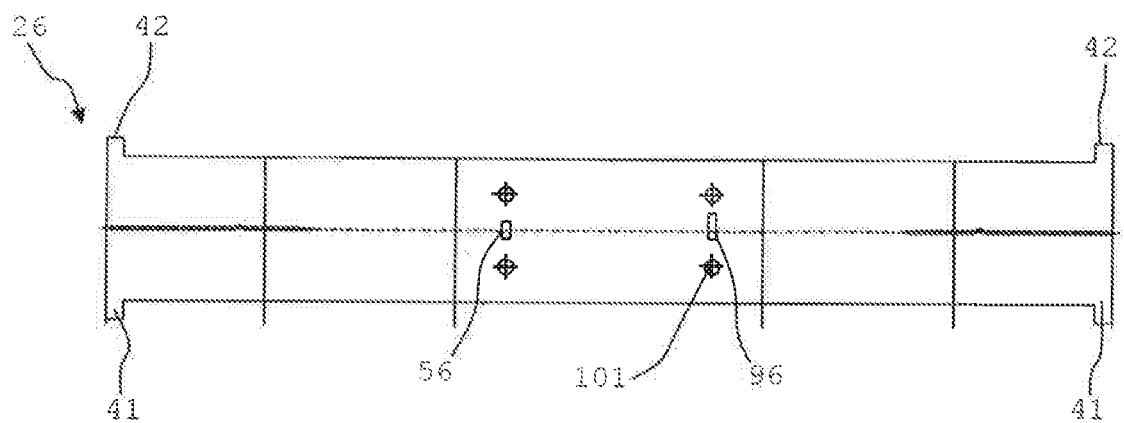
FIG. 14 shows, in a top view, a blank of a leaf spring used in the female contact element of FIG. 12.
Figure 15A:
FIG. 15A to FIG. 17B show, in a side view and top view respectively, leaf springs used in the female contact element of FIG. 12.
Figure 16A:
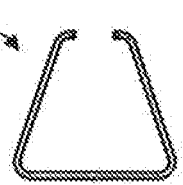
Figure 17A:
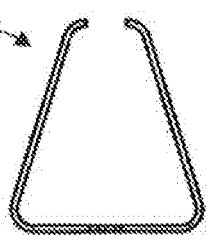
Figure 15B:
Figure 16B:
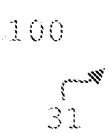
Figure 17B:

As shown in FIG. 13, the bars 91, 92 may be engaged with holes, for example square holes, 93 of respective plates 89, 90. Further, a connector 94 may protrude at right angles from the plate 89 and be formed integrally therewith. The connector 94 has a locating pin 95 extending at right angles from the connector 94 and formed integrally therewith. In the assembled state, the pin 95 reaches through holes 97 in each of the preloading springs 30, 31, 32 shown in FIGS. 15A to 17B. Further, the pin 95 reaches through a corresponding hole 96 in the outer leaf spring 26 as shown in FIG. 14 illustrating the outer leaf spring 26 right after being cut from flat plate material, i.e. in an unbent state. The holes 96, 97 are designed so as to take up two pins 95 from corresponding plates 89, 90. In the assembled state, rivets or bolts 98 (see FIG. 13) attach each connector 94—and therefore the plates 89, 90—to each of the preload springs 30, 31, 32, the outer leaf spring 26 and the base 28. The bolt 98 passes through a hole 99 in the connector 94, a corresponding hole 100 in each of the preload springs 30, 31, 32 and a corresponding hole 101 in the outer leaf spring 26.

In the present example, there is no need for welding the bars 91, 92 to the plates 89, 90 due to the positive fit provided between the components. Yet, the bars 91, 92 may be welded to the plates 89, 90 in another embodiment. However, the positive fit allows for easy disassembly of the female contact element 26 of the second embodiment.

The cage 88 grasps around the full parameter of two adjacent U-shaped portions 36, 45 (or U-shaped portions 35, 44 for the cage 88 on the left-hand side of FIG. 12). Thus, the bars 91, 92 support the straight portions 37 and 46 of each of the U-shaped portions 45, 36 of the outer and inner leaf spring 26, 27. As a result, the base 28 of the second embodiment is not required to have converging free ends 84, 85 (see FIG. 5). Rather, the base 28 may be configured as a single flat piece.

Although the present invention has been described in accordance with preferred embodiments, it is obvious for the skilled person in the art that modifications are possible in all embodiments.

LIST OF REFERENCE NUMERALS 1 slip ring motor
2 rotor
3a, 3b windings
4 cable
5 cable
6 slip ring
7 slip ring
9 shaft
10 external resistance
11 brush
12 brush
14 male contact element
15 rotating unit
16 male contact element
17 ring
18 rotating unit
19 ring
20 base ring element
21 conducting ring element
22 female contact element
23 female contact element
24 axis
26 outer leaf spring
27 inner leaf spring
28 base
29 bracket
30, 31, 32 preloading springs
33 counter plate
34 base portion
35 U-shaped portion
36 U-shaped portion
37 straight portion
38 bent portion 39 contact portion
40 free end
41 projection
42 projection
43 base portion
44 U-shaped portion
45 U-shaped portion
46 straight portion
47 bent portion
48 contact portion
49 free end
50 projection
51 slot
52 slot
53 base
54 contact portion
55 contact portion
56 direction
57 direction
58 base
59 leg
60 leg
61 open side
62 free end
63 free end
64 surface
65 surface
66 bolt
67 U-shaped portion
68 U-shaped portion
69 base portion
70 side
71 latch
72 latch
73 abutting portion
74 abutting portion
75 recess
76 recess
77 bolt
78 side face
79 side face
80 direction
81 direction
82 direction
83 base portion
84 free end
85 free end
86 edge
87 incision
88 cage
89 plate
90 plate
91 bar
92 bar
93 hole
94 connector
95 locating pin
96 hole
97 hole
98 bolt
99 hole
100 hole
101 hole
α angle
D1, D2 thicknesses
R1-R4 radii
X, Y, Z axes

The invention claimed is:

1. A slip ring motor with a power output of >1 MW, comprising a female contact element, the female contact element including
two contact portions defining a slot therebetween, and
a retraining unit restraining movement of the two contact portions, wherein the restraining unit is made of steel,
wherein a plurality of projections project from free ends of the two contact portions,
wherein the restraining unit engages the plurality of projections,
wherein the female contact element is configured for engagement with a male contact element thereby making an electrical connection between the female contact element and the male contact element when providing the power output of >1 MW, the female contact element comprising a Cu—Be alloy,
wherein a corresponding contact portion of the male contact element is insertable into the slot,
wherein the two contact portions of the female contact element spread apart elastically when the corresponding contact portion of the male contact element is inserted into the slot thereby making the electrical connection, and
wherein the two contact portions comprise the Cu—Be alloy.

2. The slip ring motor of claim 1, wherein the Cu—Be alloy comprises 0.1 to 3 wt % Be.

3. The slip ring motor of claim 1, wherein the Cu—Be alloy comprises 0.1 to 2 wt % Be.

4. The slip ring motor of claim 1, wherein the Cu—Be alloy further comprises Ni or Co or both.

5. The slip ring motor of claim 1, wherein the Cu—Be alloy is age hardened or cold hammered.

6. The slip ring motor of claim 1, wherein the Cu—Be alloy is silver coated.

7. The slip ring motor of claim 1, comprising at least one contact portion configured to be deformed elastically for making the electrical connection wherein the contact portion comprises the Cu—Be Alloy.

8. The slip ring motor of claim 7, further comprising at least one leaf spring that includes the at least one contact portion, wherein the at least one leaf spring has a thickness >1 mm, and at least one bend having an inside radius of <10 mm.

9. The slip ring motor of claim 8, wherein the at least one leaf spring has a thickness >1.5 mm.

10. The slip ring motor of claim 8, wherein the at least one bend of the at least leaf spring has an inside radius of <6 mm.

11. The slip ring motor of claim 1, comprising two contact portions defining a slot therebetween, wherein a corresponding contact portion of the male contact element is insertable into the slot, wherein the two contact portions of the female contact element spread apart elastically when the corresponding contact portion of the male contact element is inserted into the slot thereby making the electrical connection, and wherein the two contact portions comprise the Cu—Be alloy.

12. The slip ring motor of claim 11, further comprising a plurality of leaf springs preloading the two contact portions so as to counteract their spreading apart when the contact portion of the male contact element is inserted into the slot, wherein the preload produced by each leaf spring is the same, wherein the leaf springs are preferably made of steel.

13. The slip ring motor of claim 11, further comprising a restraining unit restraining movement of the two contact portions, wherein the restraining unit is made of steel.

14. The slip ring motor of claim 13, wherein a plurality of projections project from free ends of the two contact portions, and wherein the restraining unit engages the projections.

15. The slip ring motor of claim 14, wherein one or more of the projections are made in one piece with an associated contact portion and of the same material as the associated contact portion.

16. The slip ring motor of claim 11, comprising two leaf springs, each leaf spring having a U-shaped portion comprising one of the two contact portions.

17. The slip ring motor of claim 16, further comprising a base to which the two leaf springs are attached, wherein the base is made of steel.

18. A female contact element for a slip ring motor having a power output >1 MW, the female contact element comprising:
    two contact portions defining a slot therebetween, and
    a retraining unit restraining movement of the two contact portions, wherein the restraining unit is made of steel,
    wherein a plurality of projections project from free ends of the two contact portions,
    wherein the restraining unit engages the plurality of projections,
    wherein the female contact element is configured for engagement with a male contact element thereby making an electrical connection between the female contact element and the male contact element, the female contact element comprising a Cu—Be alloy,
    wherein a corresponding contact portion of the male contact element is insertable into the slot,
    wherein the two contact portions of the female contact element spread apart elastically when the corresponding contact portion of the male contact element is inserted into the slot thereby making the electrical connection, and
    wherein the two contact portions comprise the Cu—Be alloy.

19. A slip ring motor with a power output of >1 MW, comprising:
    a female contact element according to claim 18,
    a male contact element,
    a first rotating unit, and
    a second rotating unit,
    wherein the female contact element is configured for engagement with the male contact element thereby making an electrical connection between the female contact element and the male contact element, the female contact element comprising a Cu—Be alloy,
    wherein the slip ring motor has a first state in which the first rotating unit and the second rotating unit are spaced apart from each other such that the male and female contact elements are configured to disengage from one another, and a second state in which the male contact element is configured to engage the female contact element.

20. A slip ring motor with a power output of >1 MW, comprising a female contact element,
    wherein the female contact element is configured for engagement with a male contact element thereby making an electrical connection between the female contact element and the male contact element when providing the power output of >1 MW, the female contact element comprising a Cu—Be alloy,
    two contact portions defining a slot therebetween, wherein a corresponding contact portion of the male contact element is insertable into the slot, wherein the two contact portions of the female contact element spread apart elastically when the corresponding contact portion of the male contact element is inserted into the slot thereby making the electrical connection, and wherein the two contact portions comprise the Cu—Be alloy, and
    a restraining unit restraining movement of the two contact portions, wherein the restraining unit is made of steel,
    wherein a plurality of projections project from free ends of the two contact portions, and wherein the restraining unit engages the projections.

* * * * *